(12) United States Patent
    Zheng

(10) Patent No.: US 12,143,706 B2
(45) Date of Patent: Nov. 12, 2024

(54) WEARABLE DEVICE AND DISPLAY METHOD

(71) Applicant: VIVO MOBILE COMMUNICATION CO., LTD., Guangdong (CN)

(72) Inventor: Caiyin Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 300 days.

(21) Appl. No.: 17/687,383

(22) Filed: Mar. 4, 2022

(65) Prior Publication Data

US 2022/0191387 A1 Jun. 16, 2022

Related U.S. Application Data

(63) Continuation of application No. PCT/CN2020/106196, filed on Jul. 31, 2020.

(30) Foreign Application Priority Data

Sep. 23, 2019 (CN) .......................... 201910900556.9

(51) Int. Cl.
  H04N 23/62 (2023.01)
  G01D 5/165 (2006.01)
  (Continued)

(52) U.S. Cl.
  CPC ............. H04N 23/62 (2023.01); G01D 5/165 (2013.01); G04G 21/00 (2013.01); G06F 3/14 (2013.01); H04N 23/57 (2023.01); H04N 23/667 (2023.01)

(58) Field of Classification Search
  CPC ...... H04N 23/62; H04N 23/57; H04N 23/667; H04N 23/51; G01D 5/165; G04G 21/00;
  (Continued)

(56) References Cited

U.S. PATENT DOCUMENTS 5,734,626 A     3/1998  Eckstein
5,986,421 A  *  11/1999 Fukazawa ............ G01D 5/1655
                                                                318/470
(Continued)

FOREIGN PATENT DOCUMENTS

CH      713251 A2   6/2018
CN     1152139 A    6/1997
(Continued)

OTHER PUBLICATIONS

The First Office Action of Priority Application No. CN 201910900556.9 issued by the Chinese Patent Office on Aug. 19, 2020.
(Continued)

Primary Examiner — Sinh Tran
Assistant Examiner — Zhenzhen Wu
(74) Attorney, Agent, or Firm — IP & T GROUP LLP

(57) ABSTRACT

A wearable device includes a dial plate, a watch body and an angle detection member. The dial plate is provided with an accommodating groove. The watch body is at least partially disposed in the accommodating groove and is rotatably connected to the dial plate, and the watch body is provided with a functional component. The angle detection member includes an annular resistor and a conductive connector electrically connected to the annular resistor. One of the annular resistor and the conductive connector is disposed at the dial plate, and the other is disposed at the watch body. The annular resistor is in sliding connection with the conductive connector.

19 Claims, 11 Drawing Sheets

(51) Int. Cl.
  *G04G 21/00* (2010.01)
  *G06F 3/14* (2006.01)
  *H04N 23/57* (2023.01)
  *H04N 23/667* (2023.01)

(58) Field of Classification Search
  CPC ...... G04G 17/02; G04G 17/04; G04G 17/045; G04G 17/06; G04G 21/02; G04G 17/00; G06F 3/14; G04C 3/002; G09G 2320/028; G09G 2354/00; G09G 2360/144; G09G 3/20; G04B 19/06; G04B 47/00; G04B 47/06
  See application file for complete search history.

(56) References Cited

U.S. PATENT DOCUMENTS

| | | | | |
|---|---|---|---|---|
| 6,347,482 | B1 * | 2/2002 | Takiguchi | H02H 7/0851 49/28 |
| 2015/0003210 | A1 | 1/2015 | Joung et al. | |
| 2015/0189134 | A1 | 7/2015 | Joo et al. | |
| 2016/0202665 | A1 | 7/2016 | Park | |
| 2017/0097248 | A1 | 4/2017 | Eom et al. | |
| 2018/0307333 | A1 * | 10/2018 | Lim | G04R 20/02 |
| 2020/0159172 | A1 * | 5/2020 | Bushnell | G04B 3/04 |
| 2020/0374437 | A1 * | 11/2020 | Kang | H04N 5/262 |

FOREIGN PATENT DOCUMENTS

| | | | |
|---|---|---|---|
| CN | 200968856 | Y | 10/2007 |
| CN | 104315970 | A | 1/2015 |
| CN | 104767844 | A | 7/2015 |
| CN | 104977845 | A | 10/2015 |
| CN | 105389074 | A | 3/2016 |
| CN | 105518543 | A | 4/2016 |
| CN | 105675185 | A | 6/2016 |
| CN | 205809552 | U * | 12/2016 |
| CN | 106325055 | A | 1/2017 |
| CN | 206270672 | U | 6/2017 |
| CN | 107289919 | A * | 10/2017 |
| CN | 207976717 | U * | 10/2018 |
| CN | 108732913 | A | 11/2018 |
| CN | 208283732 | U | 12/2018 |
| CN | 110716420 | A | 1/2020 |
| EP | 2816450 | A1 | 12/2014 |
| JP | 2003-344573 | A | 12/2003 |
| WO | 2014/168300 | A1 | 10/2014 |

OTHER PUBLICATIONS

International Search Report and Written Opinion of International Application No. PCT/CN2020/106196 issued by the Chinese Patent Office on Nov. 4, 2020.

* cited by examiner

WEARABLE DEVICE AND DISPLAY METHOD

CROSS REFERENCE TO RELATED APPLICATIONS

This application is a Bypass Continuation Application of PCT/CN2020/106196 filed on Jul. 31, 2020, which claims priority to Chinese Patent Application No. 201910900556.9 filed on Sep. 23, 2019, which are incorporated herein by reference in their entirety.

TECHNICAL FIELD

The present disclosure relates to the field of wearable technologies, and in particular to a wearable device and a display method.

BACKGROUND

With the popularity of wearable devices such as watches, people have great demands for conversation, taking photos, and the like using the wearable devices apart from looking at the time, counting steps, positioning, and the like. Therefore, functional components such as camera components are added to the wearable devices, which can meet the demands of taking photos of scenery, taking selfies, or video calls.

SUMMARY

According to a first aspect, a wearable device is provided according to an embodiment of the present disclosure, where the wearable device includes a dial plate, a watch body, and an angle detection member. The dial plate is provided with an accommodating groove, the watch body is at least partially disposed in the accommodating groove and rotatably connected to the dial plate, and the watch body is provided with a functional component. The angle detection member includes an annular resistor and a conductive connector electrically connected to the annular resistor. One of the annular resistor and the conductive connector is disposed at the dial plate, and the other is disposed at the watch body. The annular resistor is in sliding connection with the conductive connector.

According to a second aspect, an embodiment of the present disclosure provides a display method performed by a wearable device. The wearable device includes a dial plate, a watch body, and an angle detection member. The dial plate is provided with an accommodating groove. The watch body is at least partially disposed in the accommodating groove and is rotatably connected to the dial plate, and the watch body is provided with a display screen and a camera component. The angle detection member includes an annular resistor and a conductive connector electrically connected to the annular resistor. One of the annular resistor and the conductive connector is disposed at the dial plate, and the other is disposed at the watch body. The annular resistor is in sliding connection with the conductive connector. The method includes: receiving first angle information of the angle detection member; and controlling a display direction of the display interface of the display screen according to the first angle information.

According to a third aspect, an embodiment of the present disclosure provides a wearable device. The wearable device includes a dial plate, a watch body, and an angle detection member. The dial plate is provided with an accommodating groove. The watch body is at least partially disposed in the accommodating groove and is rotatably connected to the dial plate, and the watch body is provided with a display screen and a camera component. The angle detection member includes an annular resistor and a conductive connector electrically connected to the annular resistor. One of the annular resistor and the conductive connector is disposed at the dial plate, and the other is disposed at the watch body. The annular resistor is in sliding connection with the conductive connector. The wearable device further includes: a receiving module configured to receive first angle information of the angle detection member; and a control module configured to control a display direction of a display interface of the display screen according to the first angle information.

According to a fourth aspect, an embodiment of the present disclosure provides a wearable device, including a processor, a memory, and a computer program that is stored in the memory and that executable on the processor, where when the computer program is executed by the processor, the steps of the display method according to any one of the foregoing embodiments are implemented.

According to a fifth aspect, an embodiment of the present disclosure provides a non-transitory computer-readable storage medium, where the non-transitory computer-readable storage medium stores a computer program, and when the computer program is executed by a processor, steps of the display method according to any one of the foregoing embodiments are implemented.

According to a sixth aspect, a computer program product is provided according to an embodiment of the present disclosure, where the computer program product is stored in a nonvolatile storage medium and configured to be executed by at least one processor to implement the steps of the display method according to any one of the foregoing embodiments.

According to a seventh aspect, a wearable device is provided according to an embodiment of the present disclosure, where the wearable device is configured to perform the display method according to any one of the foregoing embodiments.

BRIEF DESCRIPTION OF DRAWINGS

The following describes features, advantages, and technical effects of the exemplary embodiments of the present disclosure with reference to the accompanying drawings.

Figure 1:
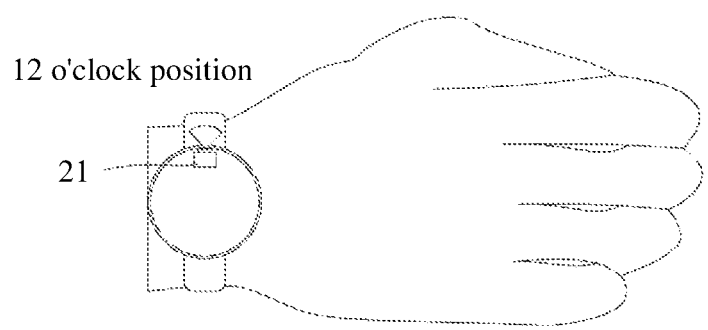
FIG. 1 is another schematic diagram of an arrangement of a camera component in a wearable device.

where:

X-Rotation Direction

10—Dial plate; 11—Accommodating groove; 111—First side surface; 112—First bottom surface; 12—Installation groove; 13—Limiting ball; 14—Elastic member; 15—Annular open groove;

20—Watch body; 21—Camera component; 22—Limiting groove; 23—First housing; 231—Body part; 232—First protrusion; 232a—Chamfered structure; 232b—Chamfered surface; 233—Second side surface; 234—Second bottom surface; 24—Display screen; 25—First accommodating cavity;

30—Angle detection member; 31—Annular resistor; 311—First annular part; 311a—First free end; 312—Second annular part; 312a—Second free end; 313—Connecting part; 32—Conductive connector; 321—First connector; 322—Second connector;

40—Rotary connector; 41—Rotary guide rail; 42—Guide member;

50—Watch band;

60—Support member;

70—Gap;

400—Control module; 410—Determination unit; 420—First adjustment unit; 430—Second adjustment unit; 431—Determination subunit; 432—Acquisition subunit; 433—Adjustment subunit; 440—Third adjustment unit;

500—Mobile terminal; 501—Radio frequency unit; 502—Network module; 503—Audio output unit; 504—Input unit; 5041—Graphics processing unit; 5042—Microphone; 505—Sensor; 506—Display unit; 5061—Display panel; 507—User input unit; 5071—Touch panel; 5072—Another input device; 508—Interface unit; 509—Memory; 510—Processor; 511—Power supply.

In the drawings, same reference numerals are used for same components. The drawings are not drawn to actual scales.

DESCRIPTION OF EMBODIMENT

Characteristics and exemplary embodiments of various aspects of the present disclosure are described below in detail. In the following detailed descriptions, many details are provided to thoroughly understand the present disclosure. However, it is very clear to a person skilled in the art that the present disclosure can be implemented without some of these details. The following descriptions of the embodiments merely intend to provide examples of the present disclosure to better understand the present disclosure. In the drawings and the following description, at least some well-known structures and technologies are not shown, so as to avoid unnecessary obscuring of the present disclosure; and, for clarity, sizes of some structures may be exaggerated. Furthermore, features, structures, or characteristics described below may be combined in one or more embodiments in any suitable manner.

Orientation words appearing in the following description are directions shown in figures, and do not limit a specific structure of a wearable device and a display method of the present disclosure. In the description of the present disclosure, it should be further noted that the terms "installation" and "connection" should be understood broadly. For example, the connection may be fixed connection, detachable connection, or integrated connection; and the connection may be direct connection or indirect connection. For those of ordinary skill in the art, specific meanings of the foregoing terms in the present disclosure may be understood according to specific circumstances.

Figure 2:
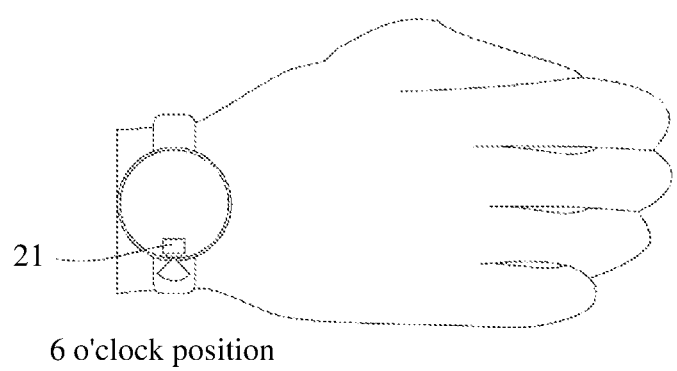
FIG. 2 is a schematic diagram of an arrangement of the camera component in the wearable device.
Figure 3:
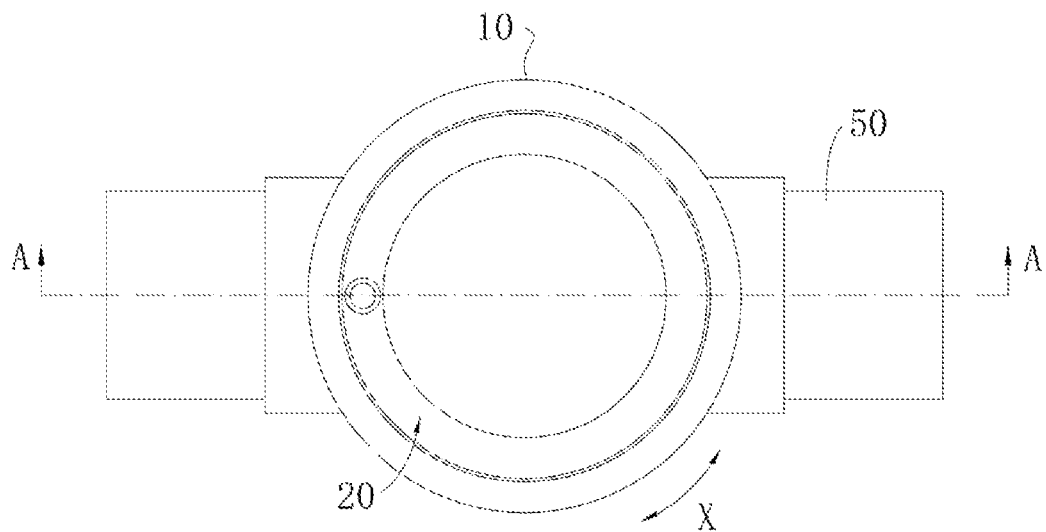
FIG. 3 is a top view of a wearable device according to an embodiment of the present disclosure.
Figure 4:
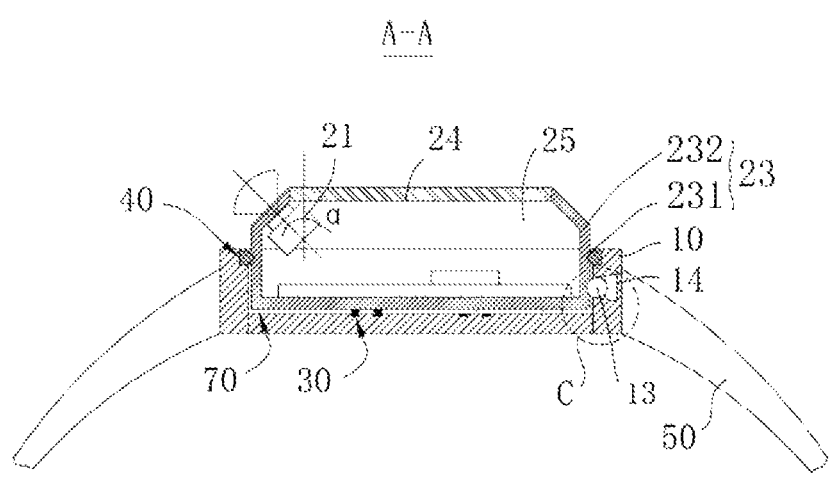
FIG. 4 is a sectional view taken along a direction A-A in FIG. 3.
Figure 5:
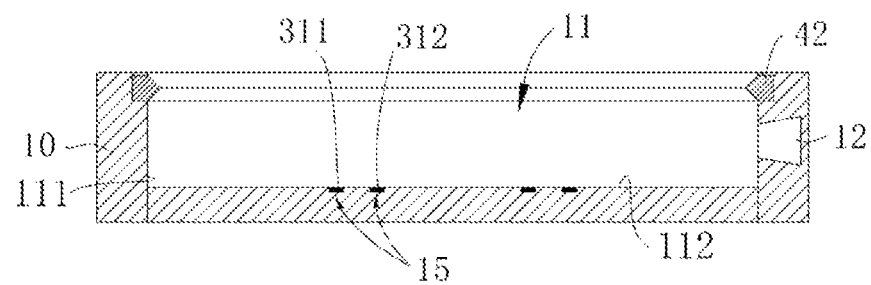
FIG. 5 is a schematic sectional view of a dial plate according to an embodiment of the present disclosure.
Figure 6:
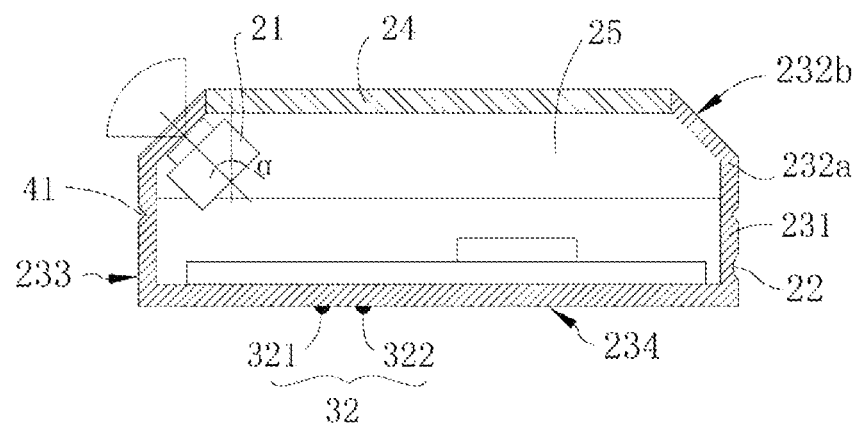
FIG. 6 is a schematic sectional view of a watch body according to an embodiment of the present disclosure.
Figure 7:
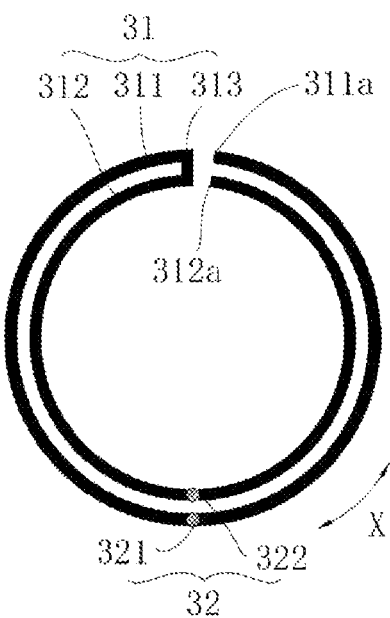
FIG. 7 is a schematic structural diagram of an angle detection member according to an embodiment of the present disclosure.
Figure 8:
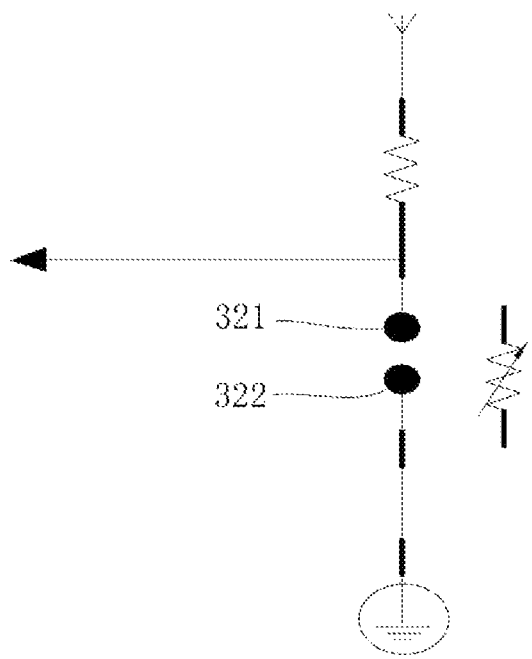
FIG. 8 is a circuit diagram of an angle detection member according to an embodiment of the present disclosure.

Lately, an existing wearable device with a camera shooting function is usually provided with only one camera due to space limitations, which makes it difficult to shoot on location and take a selfie simultaneously when the wearable device is not taken down. As shown in FIG. 1, a camera component 21 is located at an upper end of a wearable device, that is, the 12 o'clock direction of the wearable device, and the shooting angle is upward, which makes it very easy to shoot on location. However, it is difficult to take a selfie in this arrangement. As shown in FIG. 2, if the camera component 21 is arranged at a lower end of a watch, that is, at the 6 o'clock direction of the wearable device, and the shooting angle is downward, it is very easy to take a selfie. However, it is difficult to shoot on location scenes in this arrangement. In other words, the existing wearable devices with camera components or other functional components cannot implement shooting at different angles or other functions, and thus cannot meet user's requirements.

To better understand the present disclosure, a wearable device and display method according to embodiments of the present disclosure will be described in detail below with reference to FIG. 3 to FIG. 21.

As shown in FIG. 3 to FIG. 6, embodiments of the present provide a wearable device. The wearable device includes a dial plate 10, a watch body 20, and an angle detection member 30. The dial plate 10 is provided with an accommodating groove 11. The watch body 20 is at least partially disposed in the accommodating groove 11 and is rotatably connected to the dial plate 10, and the watch body 20 is provided with a functional component. The angle detection member 30 includes an annular resistor 31 and a conductive connector 32 electrically connected to the annular resistor 31. One of the annular resistor 31 and the conductive connector 32 is disposed at the dial plate 10, and the other is disposed at the watch body 20. The annular resistor 31 is in sliding connection with the conductive connector 32.

For the wearable device according to the embodiments of the present disclosure, the functional component is disposed at the watch body 20, and the watch body 20 is rotatably connected to the dial plate 10, so that the functional component can be used at different positions. In other words, shooting or other functional requirements of the wearable device at different view angles can be achieved. The correspondingly disposed angle detection member 30 can be configured to determine a position of the watch body 20 relative to the dial plate 10 by measuring electrical parameters such as a resistance value, which is more conducive to position adjustment of the functional component relative to the dial plate 10.

In some alternative examples, the dial plate 10 as a whole may have a circular disk-like structure, and the accommodating groove 11 may be formed through recessing of one end surface of the dial plate 10 in its own axial direction. A wall surface surrounding the accommodating groove 11 includes a first side surface 111 and a first bottom surface 112. The first side surface 111 is disposed around the first bottom surface 112.

It should be noted that the functional component mentioned in the present disclosure may have various forms, such as an earpiece, a microphone, a speaker, an antenna, a flashlight, an infrared ray, or an imaging component 21, etc. To facilitate understanding of the present disclosure, the functional component including the imaging component 21 will be described below as specific examples.

In some alternative examples, the watch body 20 may include a display screen 24 and a first housing 23. The display screen 24 is disposed on a side of the first housing 23 away from the dial plate 10. The functional component is displayed on a side of the watch body 20 away from the dial plate 10, and the display screen 24 and the first housing 23 form a first accommodation cavity 25. The watch body 20 may be inserted into the accommodating groove 11 of the dial plate 10 through the first housing 23 and rotatably connected to the dial plate 10. The watch body 20 is designed in the foregoing form and has a simple structure. Through disposing of the first housing 23 and the display screen 24, the wearable device has a display function while the watch body 20 is rotatably connected to the dial plate 10.

As an alternative implementation, the first housing 23 has a body part 231 disposed in the accommodating groove 11 and a first protrusion 232 disposed outside the accommodating groove 11. Both the display screen 24 and the functional component are disposed at the first protrusion 232. Through the disposing, not only the watch body 20 can be rotatably connected to the dial plate 10, but also the watch body can be locked when rotated to a preset position. In addition, by disposing the first protrusion 232, the user may hold and screw the first protrusion 232 easily, so that the watch body 20 may rotate relative to the dial plate 10.

In some alternative examples, the first protrusion 232 has a chamfered structure 232a, and a cross-sectional area of the first protrusion 232 gradually decreases along a direction from an end of the first protrusion 232 proximate to the dial plate 10 to an end of the first protrusion 232 away from the dial plate 10. Through the disposing, the appearance of the wearable device can be more beautiful, and the user may hold the first protrusion 232 more comfortably.

Alternatively, the chamfered structure 232a includes a chamfered surface 232b disposed around the display screen 24. The functional component including a camera component 21 is still used as an example. The camera component 21 is connected to the chamfered structure 232a and a lens faces the chamfered surface 232b. An included angle α between a camera direction of the camera component 21 and a normal direction of a plane where the display screen 24 is located is any numerical value between 30° and 60°, with 30° and 60° included. By disposing the angle, the user can see a picture on the display screen 24 more easily when the camera component 21 is taking a selfie or shooting on location.

Further optionally, when the included angle α between the camera direction of the camera component 21 and the normal direction of the plane where the display screen 24 is located is any value between 40° and 50°, and the user wears the wearable device on a wrist, the user's arm posture can meet the ergonomics when the user is shooting on location or taking a selfie, and the user may perform shooting comfortably in different shooting functions. Further, alternatively, when the included angle α between the camera direction of the camera component 21 and the normal direction of a plane where the display screen 24 is located is 45°, not only the user can perform shooting comfortably in different shooting functions, but also the user can have a better viewing angle for a photographed object displayed on the display screen 24 during shooting.

Please refer to FIG. 3 to FIG. 8, it can be understood that the angle detection member 30 of the wearable device provided according to the foregoing embodiments of the present disclosure may have various structural forms, which is mainly used for detecting a rotation angle of a watch body 20 relative to a dial plate 10, so as to better control the wearable device.

By using the principle of a sliding rheostat, the angle detection member 30 provided according to the embodiments of the present disclosure detects, when a connection position at which a conductive connector 32 is connected to a ring resistor 31 changes due to rotation of the watch body 20 relative to the dial plate 10, a rotation angle of the watch body 20 relative to the dial plate 10 by changing electrical parameters such as a resistance value of a ring resistor 31 in a detection circuit.

In some alternative embodiments, the annular resistor 31 includes a first annular part 311 and a second annular part 312 which are spaced apart and electrically connected to the conductive connector 32. The first annular part 311 and the second annular part 312 are coaxially disposed, and the first annular part 311 is electrically connected to the second annular part 312 through a connecting part 313. When the ring resistor 31 is designed with the above structure, the reliability of a connection with the conductive connector 32 can be ensured, and a resistance value of the ring resistor 31 connected to the detection circuit through the conductive connector 32 can be better detected, so as to better determine the rotation angle of the watch body 20 relative to the dial plate 10.

As an alternative implementation, the first annular part 311 has two opposite first free ends 311a in a rotation direction X of the watch body 20, and the second annular part 312 has two opposite second free ends 312a in the rotation direction X. The connecting part 313 connects one of the first free ends 311a and one of the second free ends 312a, and the other of the first free ends 311a is disconnected from the other of the second free end 312a. Through that disposing, a range of resistances of the ring resistor 31 that can be connected into the detection circuit through the conductive connector 32 is larger, that is, a range of detected rotation angles of the watch body 20 relative to the dial plate 10 is larger, which is more conducive to the control of the wearable device.

In some alternative examples, the conductive connector 32 includes a first connector 321 and a second connector 322. The first connector 321 is electrically connected to the first annular part 311, and the second connector 322 is electrically connected to the second annular part 312. Through the foregoing disposing, the annular resistor 31 can be better connected into the detection circuit through the conductive connector 32.

Alternatively, both the first connector 321 and the second connector 322 may have contact structures. Surfaces of the first connector 321 and the second connector 322 facing the annular resistor 31 are arc surfaces protruding toward the annular resistor 31.

To better understand the wearable device according to the embodiments of the present disclosure, for example, the conductive connector 32 is disposed at the watch body 20 and the annular resistor 31 is disposed at the dial plate 10. In some alternative examples, an annular open groove 15 may be disposed on the dial plate 10. The annular open groove 15 matches the annular resistor 31. Alternatively, shapes of the annular open groove and the annular resistor match each other. The annular resistor 31 may be disposed in the annular open groove 15. Alternatively, the watch body 20 may be provided with a protrusion at least partially located in the annular open groove. The conductive connector 32 is disposed on the protrusion and electrically connected to the annular resistor 31. In an implementation, the conductive connector 32 and the protrusion may be integrated to form a conductor. Certainly, in some other examples, the conductive connector and the protrusion may be independently processed and interconnected structures.

Through the disposing, an area occupied by the whole angle detection member 30 can be reduced. In addition, the reliability of a connection between the annular resistor 31 of the angle detection member and the conductive connector 32, between the annular resistor 31 and the corresponding dial plate 10, and between the conductive connector 32 and the watch body 20, can be ensured.

Figure 9:
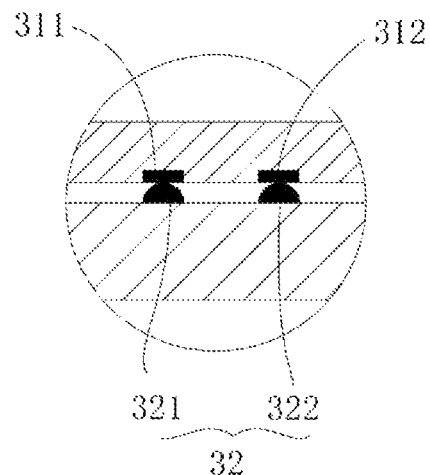
FIG. 9 is a partial schematic structural diagram of a wearable device according to another embodiment of the present disclosure.

It can be understood that, in the foregoing embodiments, for example, the annular resistor 31 is disposed at the dial plate 10 and the conductive connector 32 is disposed at the watch body 20. In some other examples, as shown in FIG. 9, an annular resistor 31 may be disposed at the watch body 20 and match an annular open groove 15 disposed on the watch body 20, and the conductive connector 32 may be disposed at the watch body 20 and match a protrusion on the watch body 20, which can also meet functional requirements of the angle detection member 30.

In some alternative examples, the annular resistor 31 is not limited to matching the annular open groove 15 and disposed in the annular open groove 15. The annular resistor 31 may further match a protrusion disposed in the watch body 20 or the dial plate 10 and be disposed at the protrusion, so that the conductive connector 32 matches the annular open groove 15 disposed on the other of the watch body 20 and the dial plate 10, and is disposed in the annular open groove 15. Therefore, the conductive connector 32 is electrically connected to the annular resistor 31 to meet use requirements.

Still referring to FIG. 3 to FIG. 9, alternatively, a first housing 23 of a watch body 20 has a second side surface 233 facing a first side surface 111 of a dial plate 10 and a second bottom surface 234 facing a first bottom surface 112. In some alternative examples, an annular open groove 15 may be formed through recessing from the first bottom surface 112 of the dial plate 10 to a direction away from the watch body 20. A radius of a first annular part 311 of an annular resistor 31 is larger than that of a second annular part 312, and a protrusion and a conductive connector 32 are disposed at the second bottom surface 234. Certainly, the annular open groove 15 may further be formed through recessing from the second bottom surface 234 to a direction away from the first bottom surface 112. In this case, the protrusion and the conductive connector 32 are disposed at the first bottom surface 112, which can meet angle detection requirements of an angle detection member 30.

Figure 10:
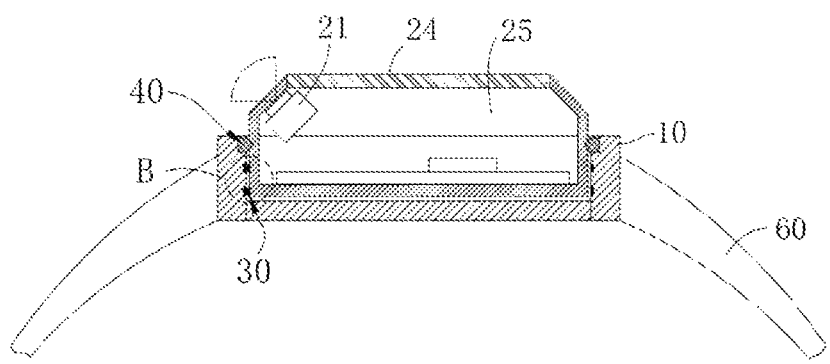
FIG. 10 is a schematic sectional view of a wearable device according to a still another embodiment of the present disclosure.
Figure 11:
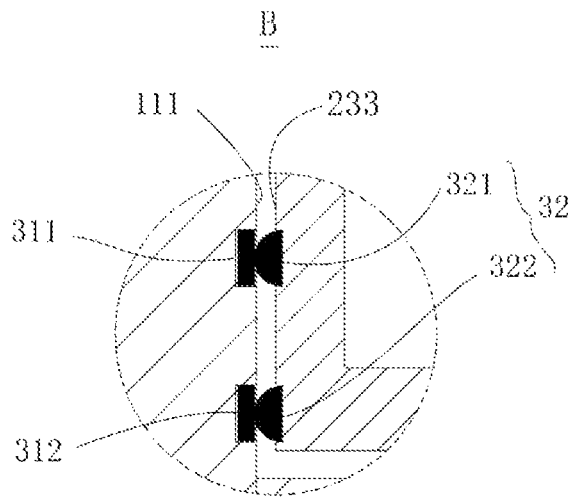
FIG. 11 is an enlarged view at B in FIG. 10.

As shown in FIG. 10 and FIG. 11, certainly, in some alternative examples, the annular open groove 15 may further be formed through recessing from the first side surface 111 to a direction away from the second side surface 233. In this case, the radius of the first annular part 311 of the annular resistor 31 may be equal to that of the second annular part 312, and the protrusion and the conductive connector 32 may be disposed at the second side surface 233, and the conductive connector 32 may be electrically connected to the annular resistor 31. Similarly, the annular open groove 15 may further be formed through recessing from the second side surface 233 to a direction away from the first side surface 111. The protrusion and the conductive connector 32 may be disposed at the first side surface 111 and the conductive connector 32 may be electrically connected to the annular resistor 31, which can still meet angle detection requirements of the angle detection member 30.

Figure 12:
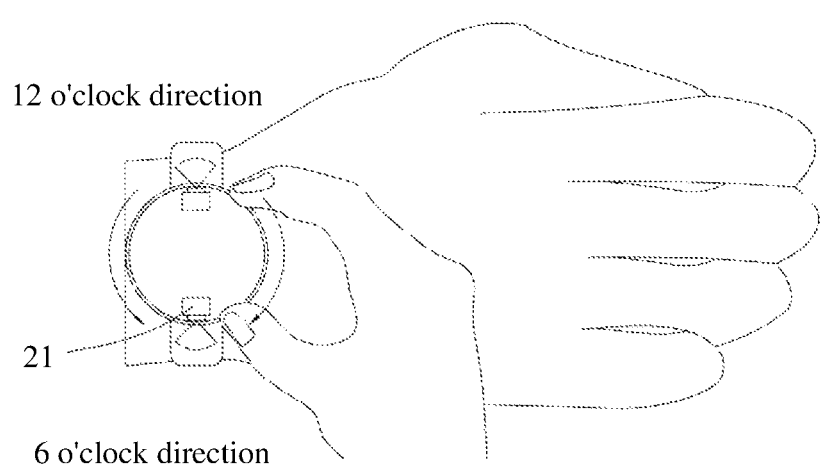
FIG. 12 is a schematic diagram of rotation of a watch body relative to a dial plate according to an embodiment of the present disclosure.
Figure 13:
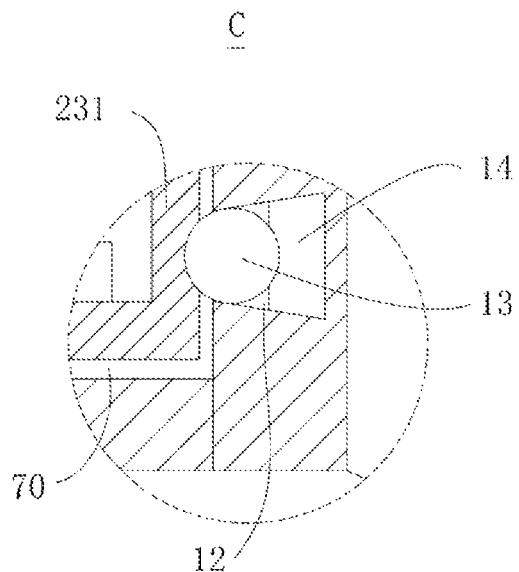
FIG. 13 is an enlarged view at C in FIG. 4.

With reference to FIG. 12, for a wearable device according to an embodiment of the present disclosure, a functional component including a camera component 21 is still used as an example. If you intend to shoot on location and take a selfie, an implementation is performed as follows. The camera component 21 may perform shooting at two predetermined positions presenting an included angle. For example, when the wearable device is a clock, the camera component 21 preferably performs shooting at two positions of 6 o'clock and 12 o'clock to better complete shooting on location and taking a selfie. Through the rotational connection between the watch body 20 and the dial plate 10, rotation between them may be reliably achieved, thus meeting requirements of selfie and location shooting. The angle detection member 30 is limited in the foregoing manner. Therefore, when the watch body 20 rotates relative to the dial plate 10, a rotation angle of the watch body 20 relative to the dial plate 10 may be determined by other electrical parameters such as a resistance value of the annual resistor 31 in the detection circuit, which helps to adjust a position of the camera component 21 and better control the wearable device, for example, control a display direction of a display screen 24 of the wearable device.

Please refer to FIG. 3 to FIG. 13, in some alternative embodiments, one of a dial plate 10 and a watch body 20 further includes a limiting ball 13 and an elastic member 14 which abut against each other, and the other is provided with a limiting groove 22. When the limiting ball 13 is at least partially located in the limiting groove 22, the dial plate 10 and the watch body 20 are clamped and fixed through the limiting ball 13 and the limiting groove 22. The dial plate 10 and the watch body 20 are clamped and fixed through the limiting ball 13 and the limiting groove 22 when the limiting ball 13 and the elastic member 14 are disposed on one of the dial plate 10 and the watch body 20, and the limiting ball 22 is disposed on the other, so that a functional component may be prevented from rotating relative to the dial plate 10 when it rotates to a predetermined position, and a problem that relative positions of the functional component and the dial plate 10 are difficult to lock is solved.

Alternatively, the dial plate 10 may include the limiting ball 13 and the elastic member 14, and the dial plate 10 is further provided with an installation groove 12. The elastic member 14 is in sliding connection with the installation groove 12, and the elastic member 14 is at least partially located in the installation groove 12. A side of the watch body 20 facing the dial plate 10 is provided with a limiting groove 22. When the installation groove 12 and the limiting groove 22 are staggered, the elastic member 14 elastically deforms. When the installation groove 12 is opposite to the limiting groove 22, the elastic member 14 elastically recovers, and the limiting ball 13 is at least partially located in the limiting groove 22.

Through the disposing, a position of the functional component can be locked as the watch body 20 rotates to a predetermined position relative to the dial plate 10, and the elastic member 14 and the limiting ball 13 may be installed easily. More importantly, with the foregoing structure, when the functional component needs to rotate to the next position, the user may make the limiting ball 13 separate from the limiting groove 22 by applying a predetermined external force, ensuring position adjustment requirements of the functional component.

In an implementation, the installation groove 12 on the dial plate 10 may be formed through recessing from a first side surface 111 to a direction away from an accommodating groove 11, and the installation groove 12 and the accommodating groove 11 communicate with each other. The formation method is conducive to processing and manufacturing, and can better ensure position locking between the watch body 20 and the dial plate 10. Alternatively, the elastic member 14 may be a spring or a spring pad with predetermined deformability, such as a rubber pad.

As an alternative implementation, a size of an opening of the installation groove 12 is smaller than a diameter of the limiting ball 13, and the limiting ball 13 is located between the watch body 20 and the elastic member 14. Through the disposing, when the watch body 20 is removed from the installation groove 12, the limiting ball 13 may be always located in the installation groove 12, avoiding the loss of the elastic member 14 or the limiting ball 13 during assembly or repair of the wearable device or replacement of the dial plate 10 or the watch body 20 with a one having a different color, and being more conducive to assembly and molding of the wearable device.

As an alternative implementation, there may be more than two limiting grooves 22, and two or more limiting grooves 22 may be spaced apart along a rotation direction X of the watch body 20, or may be uniformly distributed at intervals. Through the disposing, when the functional component has more than two predetermined positions relative to the dial plate 10, limiting or position locking of the functional component may be implemented as the watch body 20 rotates to different predetermined positions relative to the dial plate 10.

Still referring to FIG. 3 to FIG. 13, in some alternative embodiments, the wearable device in the foregoing embodiments may further include a rotary connector 40. A dial plate 10 and a watch body 20 are rotatably connected to each other through the rotary connector 40. The rotary connector 40 includes a rotary guide rail 41 and a guide member 42 which are in cooperation with each other. One of the rotary guide rail 41 and the guide member 42 is disposed at the dial plate 10 and the other is disposed at the watch body 20. The rotary guide rail 41 extends along a rotation direction X of the watch body 20. By disposing the rotary connector 40, the watch body 20 can rotate according to a predetermined trajectory when rotating relative to the dial plate 10, thus ensuring the stability of rotation. In addition, the watch body 20 can be further limited to prevent the watch body 20 from being separated from the accommodating groove 11 of the dial plate 10 when rotating relative to the dial plate 10.

In some alternative examples, thickness of the guide member 42 gradually decreases from an end away from the rotary guide rail 41 to an end proximate to the rotary guide rail 41, and a shape of the rotary guide rail 41 matches that of the guide rail 42. Through the disposing, when functional requirements of the rotary connector 40 are ensured, it helps to partially extend a part of the guide member 42 into the rotary guide rail 41 during assembly of the wearable device, and it helps to remove the watch body 20 from the dial plate 10 during replacement of the watch body 20 or the dial plate 10.

In some alternative examples, as described above, the watch body 20 includes a second side surface 233 facing a first side surface 111 of the dial plate 10 and a second bottom surface 234 facing a first bottom surface 112 of the dial plate 10. Both the second side surface 233 and the second bottom surface 234 may be located at a body part 231 of the first housing 23. In an example, the second side surface 233 may be provided with a guide member 42, and the first side surface 111 is provided with a rotary guide rail 41 in sliding connection with the guide member 42. Certainly, in some other examples, the second bottom surface 234 is provided with a guide member 42, and the first bottom surface 112 is provided with a rotary guide rail 41 in sliding connection with the guide rail 42 located on the second bottom surface 234.

As an alternative implementation, a gap 70 is formed between the first bottom surface 112 and the second bottom surface 234. Through the disposing, a friction force between the watch body 20 and the dial plate 10 can be reduced when the watch body 20 rotates relative to the dial plate 10, so that relative rotation between the watch body 20 and the dial plate 10 is smoother.

It can be understood that, in some examples, it is also possible to define that the second side surface 233 is provided with a rotary guide rail 41, the first side surface 111 is provided with the guide member 42 in sliding connection with the rotary guide rail 41. Similarly, it is also possible to define that the second bottom surface 234 is provided with the rotary guide rail 41, and the first bottom surface 112 is provided with the guide member 42 in sliding connection with the rotary guide rail 41 located on the second bottom surface 234. Through the foregoing disposing manners, guiding and limiting of the watch body 20 and the dial plate 10 can be implemented when they rotate relative to each other.

To facilitate wearing of the wearable device, alternatively, the wearable device in the foregoing embodiments may further include a watch band 50. The watch band 50 is connected to the dial plate 10 and can form an openable or buckled fixing ring together with the dial plate 10 through enclosure.

Figure 14:
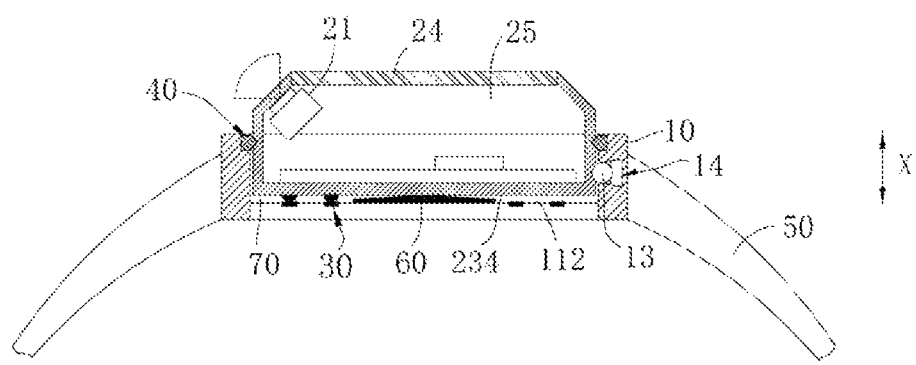
FIG. 14 is a schematic structural sectional view of a wearable device according to a yet another embodiment of the present disclosure.

As shown in FIG. 14, as an alternative implementation, the wearable device in each embodiment of the present disclosure may further include a support member 60. The support member 60 is disposed between the dial plate 10 and the watch body 20. A contact area between the support member 60 and a first bottom surface 112 is larger than that between the support member 60 and a second bottom surface 234. By disposing the support member 60 and defining the foregoing cooperation manner for the first bottom surface 112 and the second bottom surface 234, not only the watch body 20 can be supported, but also a friction force during rotation of the watch body 20 rotates relative to the dial plate 10 can be reduced, ensuring smoothness of rotation by the watch body 20.

Alternatively, the support member 60 may be disposed in the gap 70 and have various structural forms, such as a cone-shaped platform structure. A cross-sectional size of the support member 60 gradually decreases along a direction from the first bottom surface 112 to the second bottom surface 234. The structure is simple and more conducive to rotation by the watch body 20 relative to the dial plate 10.

Figure 15:
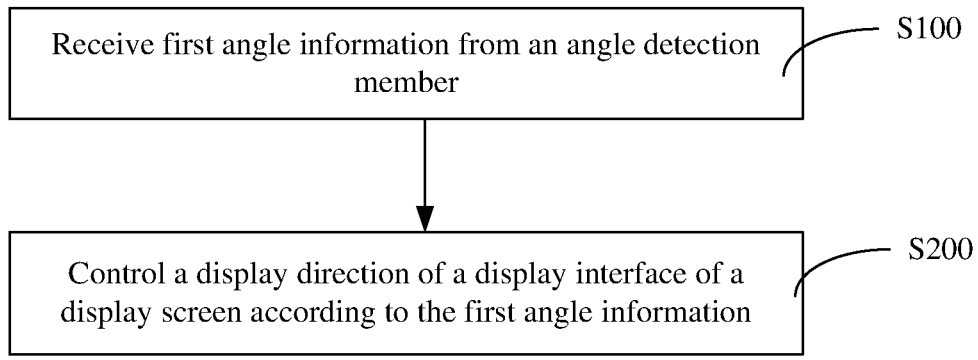
FIG. 15 is a schematic flowchart of a display method according to an embodiment of the present disclosure.

As shown in FIG. 15, further, an embodiment of the present disclosure further provides a display method performed by a wearable device. The wearable device includes a dial plate, a watch body, and an angle detection member. The dial plate is provided with an accommodating groove. The watch body is at least partially disposed in the accommodating groove and is rotatably connected to the dial plate, and the watch body is provided with a display screen and a camera component. The angle detection member includes an annular resistor and a conductive connector electrically connected to the annular resistor. One of the annular resistor and the conductive connector is disposed at the dial plate, and the other is disposed at the watch body. The annular resistor is in sliding connection with the conductive connector. The display method includes the following steps.

S100: Receive first angle information from an angle detection member.

S200: Control a display direction of a display interface of a display screen according to the first angle information. In this embodiment of the present disclosure, by receiving the first angle information from the angle detection member and controlling the display direction of the display interface of the display screen according to the first angle information, the display interface may be always displayed in a direction that is favorable for observation by the user, so that the user has better user experience.

Alternatively, the wearable device to which the display method provided according to this embodiment of the present disclosure is applied may be the wearable device in the foregoing embodiments. Mechanical structures of the wearable device in this embodiment, such as structural forms of a dial plate, a watch body, and an angle detection member and a matching relationship, may be structural forms of the dial plate 10, the watch body 20, and the angle detection member 30 of the wearable device in the foregoing embodiments. For easier understanding, according to the present disclosure, the wearable device to which the display method is applied is used as an example, such as the wearable device in FIG. 3 to FIG. 14. The same structure will not be repeated herein.

In step S100, the first angle information may be determined according to a structure of the angle detection member 30. For example, when the angle detection member 30 is designed through cooperation of the annular resistor 31 and the conductive connector 32, the first angle information includes at least one of first current information, first voltage information, or first resistance information if the annular resistor 31 is in sliding connection with the conductive connector 32. The first current information, the first voltage information, and the first resistance information correspond to an angle between the dial plate 10 and the watch body 20. For example, (1) the first angle information may be the first current information, which corresponds to the angle between the dial plate 10 and the watch body 20; (2) the first angle information may be the first voltage information, which corresponds to the angle between the dial plate 10 and the watch body 20; (3) the first angle information may be the first resistance information, which corresponds to the angle between the dial plate 10 and the watch body 20; (4) the first angle information may be the first current information and the first voltage information, both of which correspond to the angle between the dial plate 10 and the watch body 20; (5) the first angle information may be the first current information and the first resistance information, both of which correspond to the angle between the dial plate 10 and the watch body 20; (6) The first angle information may be the first voltage information and the first resistance information, both of which correspond to the angle between the dial plate 10 and the watch body 20; (7) and the first angle information may further be the first current information, first voltage information, and first resistance information, all of which correspond to the angle between the dial plate 10 and the watch body 20.

Figure 16:
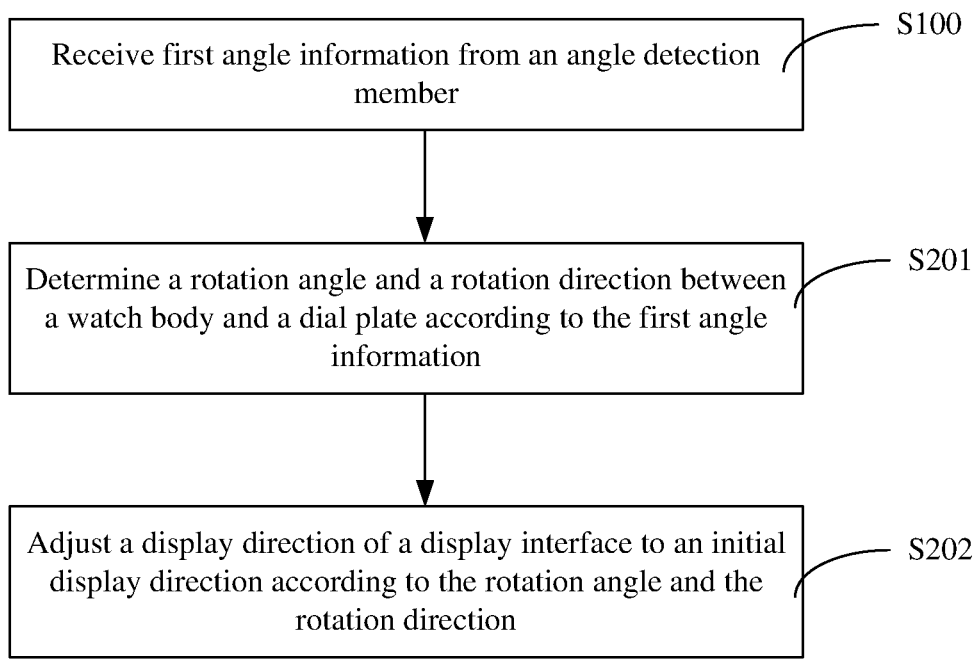
FIG. 16 is a schematic flowchart of a display method according to another embodiment of the present disclosure.

As shown in FIG. 16, in some alternative examples, step S200 may include the following steps.

S201: Determine a rotation angle and a rotation direction between a watch body 20 and a dial plate 10 according to the first angle information.

S202: Adjust a display direction of a display interface to an initial display direction according to the rotation angle and rotation direction, where the initial display direction is a display direction of the display interface of a display screen 24 when a rotation angle between the watch body 20 and the dial plate 10 is 0°.

In step 201, a set rotation angle that is of the watch body 20 relative to the dial plate 10 and that corresponds to the first angle information may be indexed according to at least one of first current information, first voltage information, or the resistance information.

For example, when the first angle information is the first resistance information and the first resistance information is an initial resistance value, the rotation angle of the watch body 20 relative to the dial plate 10 is 0°. When the first resistance information is greater than the initial resistance value, it means that a resistance value of an annular resistor 31 connected to a detection circuit becomes larger, which further means that the watch body 20 has rotated relative to the dial plate 10. The rotation angle and rotation direction of the watch body 20 relative to the dial plate 10 may be determined through an obtained resistance value of the first resistance information.

In step S202, if the rotation angle between the watch body 20 and the dial plate 10 may be determined through the first angle information, the display interface of the display screen 24 may be controlled to rotate, so that the display direction of the display interface may be adjusted to the initial display direction, which helps the user check the time, images captured by a camera component 21, or the like.

Figure 17:
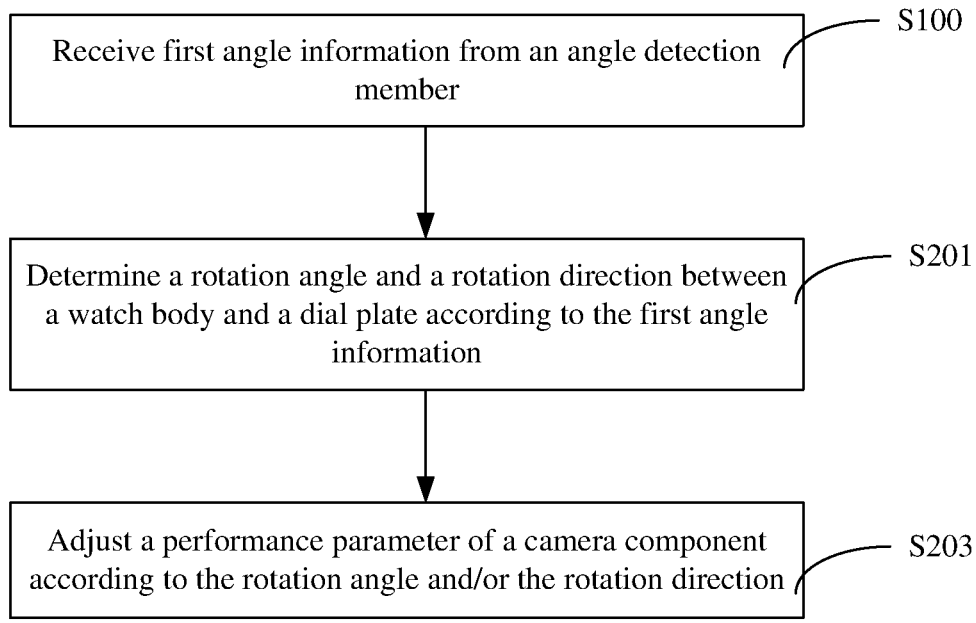
FIG. 17 is a schematic flowchart of a display method according to still another embodiment of the present disclosure.

As shown in FIG. 17, as an alternative embodiment, step S200 further includes the following step.

S203: Adjust a performance parameter of a camera component 21 according to a rotation angle and/or rotation direction, where the performance parameter includes at least one of resolution, focal length, sharpness, or contrast.

Because the main purpose of rotating the watch body 20 relative to the dial plate 10 is to adjust the camera component 21 to different positions under different shooting requirements. For example, when the watch body 20 and the dial plate 10 are in initial states, that is, when they do not rotate relative to each other, a position of the camera component 21 may be a location shooting mode. When the watch body 20 and the dial plate 10 rotate relative to each other by a predetermined angle, such as 180°, the position of the camera component 21 is a selfie mode. According to the rotation angle and/or rotation direction of the watch body 20 and the dial plate 10, the position of the camera component 21 may be known, and then the performance parameter of the camera component 21 may be adjusted to match the position, so that a shooting effect can be optimized.

In some alternative embodiments, step S203 may include:
  determining a shooting mode of a camera component 21 according to the rotation angle and/or the rotation direction;
  acquiring a value of a performance parameter in a shooting mode; and
  adjusting the camera component 21 according to the value.

In the determining a shooting mode of a camera component 21 according to the rotation angle and/or the rotation direction, the shooting mode of the camera component 21 may be known according to the rotation angle and/or rotation direction. For example, when it is known that the watch body 20 is not rotated relative to the dial plate 10, that is, the rotation angle is 0°, the shooting mode of the camera component 21 is the location shooting mode. Such shooting mode is suitable for shooting scenes, people, or large scenes. There is a greater parameter value of pixel in this mode. Similarly, when it is known that the watch body 20 rotates to a predetermined angle, for example, 180°, relative to the dial plate 10, it can be determined that the shooting mode at this time is the selfie mode, and a parameter value of the pixels may be low. In this case, a corresponding parameter of the camera component 21 may be adjusted only according to the corresponding parameter values. It is easy to control the camera component 21 and shooting effects in different modes can be ensured.

Certainly, the rotation angles 0° and 180° between the watch body 20 and the dial plate 10 and corresponding two modes are just used as an example, and the present disclosure is not limited thereto. For example, a location shooting mode or shooting mode corresponding to the rotation of the watch body 20 by 90° relative to the dial plate 10 may be defined as long as a display effect of shooting can be improved.

Figure 18:
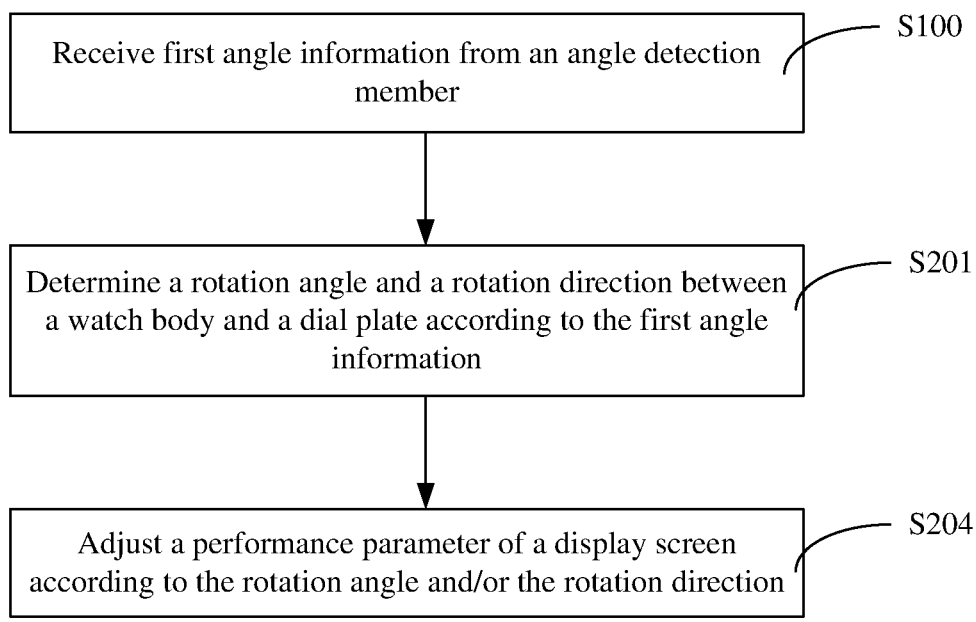
FIG. 18 is a schematic flowchart of a display method according to yet another embodiment of the present disclosure.

As shown in FIG. 18, as an alternative embodiment, step S200 further includes the following step.

S204: Adjust a display parameter of a display screen 24 according to the rotation angle and/or the rotation direction, where the display parameter includes at least one of brightness, contrast, resolution, hue, or a size of a display interface. Through the disposing, when the watch body 20 rotates to a predetermined position relative to the dial plate 10, a better display effect and better feeling can be presented to the user.

Figure 19:
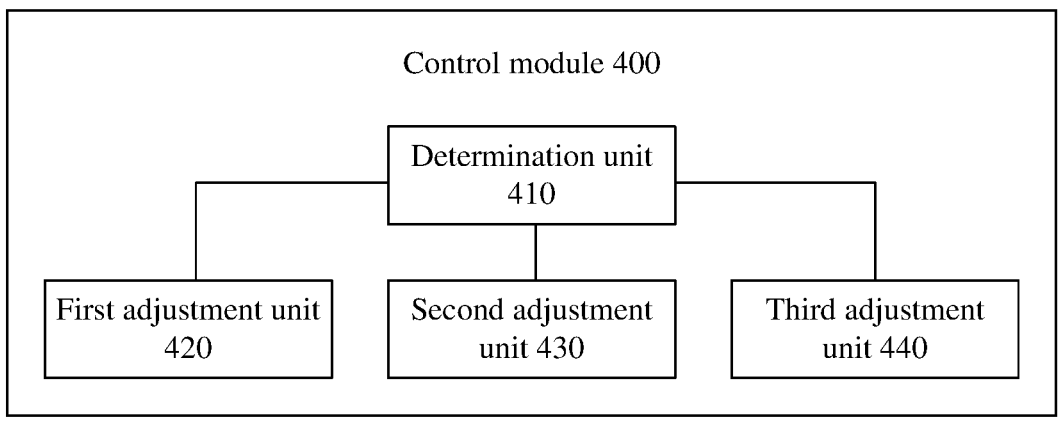
FIG. 19 is a schematic diagram of a control module of a wearable device according to another embodiment of the present disclosure.
Figure 20:
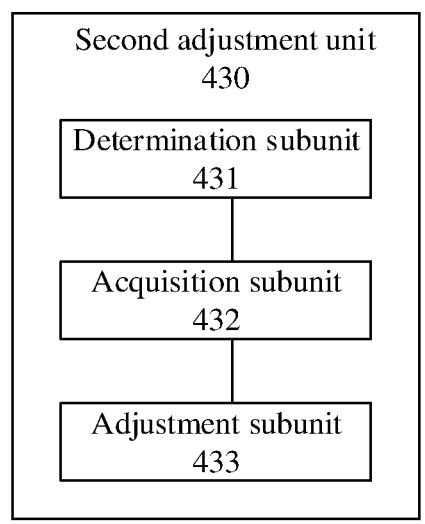
FIG. 20 is a schematic diagram of a second adjustment unit according to an embodiment of the present disclosure.

With reference to FIG. 19 and FIG. 20, an embodiment of the present disclosure further provides a wearable device. The wearable device includes a dial plate, a watch body, and an angle detection member. The dial plate is provided with an accommodating groove. The watch body is at least partially disposed in the accommodating groove and is rotatably connected to the dial plate, and the watch body is provided with a display screen and a camera component. The angle detection member includes an annular resistor and a conductive connector electrically connected to the annular resistor. One of the annular resistor and the conductive connector is disposed at the dial plate, and the other is disposed at the watch body. The annular resistor is in sliding connection with the conductive connector. The wearable device further includes a receiving module and a control module 400. The receiving module is configured to receive first angle information of an angle detection member. The control module 400 is configured to control a display direction of a display interface of a display screen according to the first angle information.

For the wearable device provided according to this embodiment of the present disclosure, by defining that the wearable device includes the receiving module and the control module 400, the receiving module is configured to receive the first angle information of the angle detection member, and the control module 400 is configured to control the display direction of the display interface of the display screen according to the first angle information, the display interface may be always displayed in a direction that is favorable for observation by the user, so that the user has better user experience.

Mechanical structures of the wearable device, such as the dial plate 10, the watch body 20, and the angle detection member 30, provided according to this embodiment of the present disclosure, and a cooperative relationship may be structural forms of the dial plate 10, the watch body 20, and the angle detection member 30 of the wearable device provided according to the foregoing embodiments. Such mechanical structures may further include the rotary connector 40, the watch band 50, and the gap 70 of the wearable device provided according to the foregoing embodiments, forming any structural form as shown in FIG. 3 to FIG. 14. The same mechanical structure will not be repeated herein.

In an implementation, the first angle information may be determined according to a structure of the angle detection member 30. For example, when the angle detection member 30 is designed through cooperation of the annular resistor 31 and the conductive connector 32, the first angle information includes at least one of first current information, first voltage information, or first resistance information if the annular resistor 31 is in sliding connection with the conductive connector 32. The first current information, the first voltage information, and the first resistance information correspond to an angle between the dial plate 10 and the watch body 20.

As an alternative implementation, the control module 400 may include a determination unit 410 and a first adjustment unit 420. The determination unit 410 is configured to determine a rotation angle and rotation direction between the watch body 20 and the dial plate 10 according to the first angle information. The first adjustment unit 420 is configured to adjust a display direction of a display interface to an initial display direction according to the rotation angle and rotation direction. The initial display direction is a display direction of a display interface of a display screen 24 when a rotation angle between the watch body 20 and the dial plate 10 is 0°.

Through the disposing, when the watch body 20 rotates relative to the dial plate 10, the display direction of the display interface of the display screen 24 can be accurately adjusted to the initial display direction, which helps the user watch.

As an alternative implementation, the control module 400 further includes a second adjustment unit 430, which is configured to adjust a performance parameter of a camera component 21 according to the rotation angle and/or rotation direction between the watch body 20 and the dial plate 10. The performance parameter includes at least one of resolution, focal length, clarity, or contrast.

Through the disposing, the performance parameter of the camera component 21 can be matched with its position, so as to optimize a shooting effect.

As shown in FIG. 20, in some alternative embodiments, the second adjustment unit 430 includes a determination subunit 431, an acquisition subunit 432, and an adjustment subunit 433. The determination subunit 431 is configured to determine a shooting mode of the camera component 21 according to the rotation angle and/or the rotation direction. The acquisition subunit 432 is configured to acquire the parameter value of the performance parameter in a shooting mode. The adjustment subunit 433 is configured to adjust the camera component 21 according to the parameter value. When the second adjustment unit 430 is formed in the foregoing manner, a corresponding parameter of the camera component 21 may be adjusted according to a parameter value corresponding to a different shooting mode, which is easy to control and can better ensure shooting effects in different shooting modes.

As an alternative implementation, the control module 400 further includes a third adjustment unit 440 which is configured to adjust a display parameter of a display screen 24 according to the rotation angle and/or the rotation direction. The display parameter includes at least one of brightness, contrast, resolution, hue, or a size of the display interface. By disposing the third adjustment unit, when the watch body 20 rotates to a predetermined position relative to the dial plate 10, a better display effect and better feeling can be presented to the user.

Figure 21:
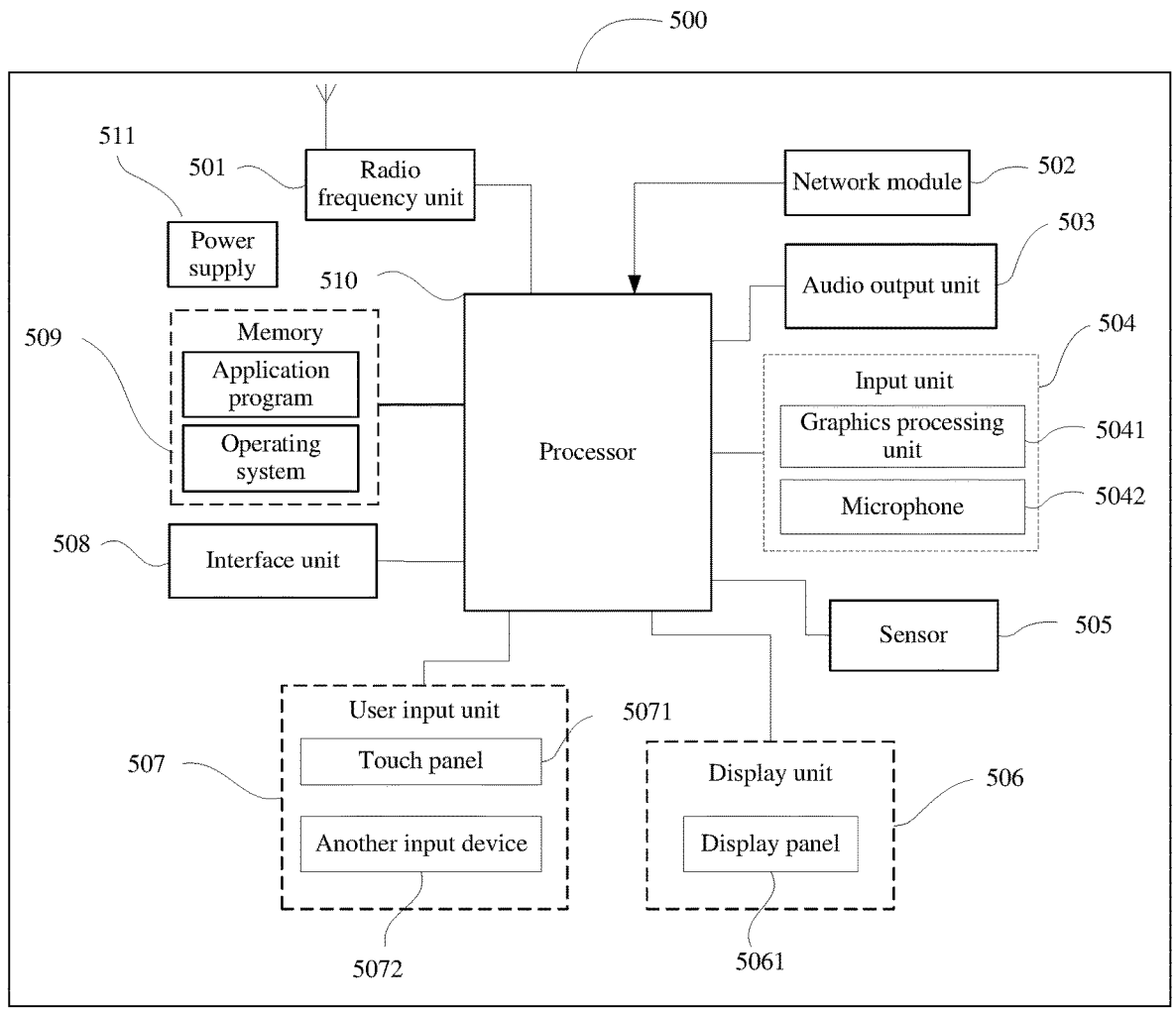
FIG. 21 is a schematic structural diagram of hardware of a wearable device according to embodiments of the present disclosure.

As shown in FIG. 21, preferably, an embodiment of the present disclosure further provides a wearable device 500. A structural form of the wearable device may be the structural form shown in FIG. 3 to FIG. 14 according to the foregoing embodiments. In addition, the wearable device 500 further includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the wearable device shown in FIG. 21 does not constitute a limitation to a wearable device, and the wearable device may include more or fewer components than those shown in the figure, a combination of some components, or different component arrangements. In an embodiment of the present disclosure, the wearable device includes but is not limited to a smart watch, a wrist band, a wrist strap, a pedometer, or the like.

The radio frequency unit 501 is configured to receive first angle information of an angle detection member.

The processor 510 is configured to control a display direction of a display interface of a display screen according to the first angle information.

For the wearable device 500 provided according to this embodiment of the present disclosure, by controlling the display direction of the display interface of the display screen, the display interface may always be displayed in a direction favorable for the user to observe, so that the user has better user experience.

It should be understood that in this embodiment of the present disclosure, the radio frequency unit 501 may be configured to receive and transmit information, or receive and transmit signals during a call. For example, the radio frequency unit 501 receives downlink data from a base station, and transmits the downlink data to the processor 510 for processing; and in addition, transmits uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communication system.

The wearable device 500 provides wireless broadband Internet access for the user by using the network module 502, for example, helping the user send and receive an e-mail, browse a web page, and access streaming media.

The audio output unit 503 may convert audio data received by the radio frequency unit 501 or the network module 502 or stored in the memory 509 to an audio signal and output the audio signal as a sound. In addition, the audio output unit 503 may further provide an audio output (for example, a call signal received sound or a message received sound) related to a specific function performed by the wearable device 500. The audio output unit 503 includes a loudspeaker, a buzzer, a telephone receiver, and the like.

The input unit 504 is configured to receive an audio signal or a video signal. The input unit 504 may include a graphics processing unit (GPU) 5041 and a microphone 5042. The graphics processing unit 5041 processes image data of a static image or video obtained by an image capture apparatus (such as, a camera) in a video capture mode or an image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process such sound into audio data. The processed audio data may be converted in a call mode into a format that may be sent by the radio frequency unit 501 to a mobile communication base station for outputting.

The wearable device 500 further includes at least one sensor 505, such as a light sensor, a motion sensor, and another sensor. For example, the light sensor includes an ambient light sensor and a proximity sensor. The ambient light sensor may adjust luminance of a display panel 5061 based on brightness of ambient light. The proximity sensor may turn off the display panel 5061 and/or backlight when the wearable device 500 is moved to an ear. As a type of the motion sensor, an accelerometer sensor may detect acceleration values in all directions (generally, three axes), and detect a value and a direction of gravity when the accelerometer sensor is static, and may be used in an application for recognizing a posture of the wearable device (such as horizontal and vertical screen switch, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by the user or information provided for the user. The display unit 506 may include the display panel 5061, and the display panel 5061 may be configured in a form of a liquid crystal display (LCD), an organic light-emitting diode (OLED), or the like.

The user input unit 507 may be configured to receive input digit or character information and generate key signal input related to user setting and function control of the wearable device. For example, the user input unit 507 includes a touch panel 5071 and another input device 5072. The touch panel 5071 is also referred to as a touchscreen, and may collect a touch operation performed by the user on or near the touch panel 5071 (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented by using a plurality of types such as a resistive type, a capacitive type, an infrared ray type, and a surface acoustic wave type. The user input unit 507 may further include another input device 5072 in addition to the touch panel 5071. The another input device 5072 may include, but is not limited to, a physical keyboard, function keys (for example, a volume control key and an on/off key), a trackball, a mouse, or a joystick. Details are not described herein.

Optionally, the touch panel 5071 may cover the display panel 5061. When detecting a touch operation on or near the touch panel 5071, the touch panel 5071 transmits the touch operation to the processor 510 to determine a type of a touch event, and then the processor 510 provides corresponding visual output on the display panel 5061 based on the type of the touch event. Although in FIG. 21, the touch panel 5071 and the display panel 5061 are configured as two independent components to implement input and output functions of the wearable device, in some embodiments, the touch panel 5071 and the display panel 5061 can be integrated to implement the input and output functions of the wearable device. Details are not limited herein.

The interface unit 508 is an interface for connecting an external apparatus with the wearable device 100. For example, the external apparatus may include a wired or wireless headset port, an external power supply (or a battery charger) port, a wired or wireless data port, a storage card port, a port configured to connect to an apparatus having an identification module, an audio input/output (I/O) port, a video I/O port, a headset port, and the like. The interface unit 508 may be configured to: receive an input (for example, data information or power) from the external apparatus, and transmit the received input to one or more elements in the wearable device 100, or may be configured to transmit data between the wearable device 100 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of a mobile phone. In addition, the memory 509 may include a high-speed random access memory, or may include a nonvolatile memory, for example, at least one disk storage device, a flash memory, or another volatile solid-state storage device.

The processor 510 is a control center of the wearable device. The processor 510 uses various interfaces and lines to connect all parts of the entire wearable device, and performs various functions and data processing of the wearable device by running or executing the software program and/or module stored in the memory 509 and invoking data stored in the memory 509, thereby performing overall monitoring on the terminal device. The processor 510 may include one or more processing units. Preferably, the processor 510 may be integrated with an application processor and a modem processor. The application processor mainly processes the operating system, the user interface, applications, etc. The modem processor mainly processes wireless communication. It can be understood that, alternatively, the modem processor may not be integrated into the processor 510.

The wearable device 500 may further include a power supply 511 (for example, a battery) which supplies power to all parts. Preferably, the power supply 511 may be in a logical connection with the processor 510 through a power supply management system, thus conducting functions such as management on charging and discharging and management on power consumption through the power supply management system.

In addition, the wearable device 500 further includes some function modules not shown, and details are not described.

An embodiment of the present disclosure further provides a non-transitory computer-readable storage medium. A computer program is stored in the non-transitory computer-readable storage medium. When the computer program is executed by a processor, processes of the foregoing embodiments of the display method can be implemented, and a same technical effect can be achieved. To avoid repetition, details are not described herein. The non-transitory computer-readable storage medium is, for example, a read-only memory (ROM), a random access memory (RAM), a magnetic disk, or an optical disc.

A person of ordinary skill in the art may realize that units and algorithm steps of various examples described with reference to the embodiments disclosed in this specification can be implemented by using electronic hardware, or a combination of a computer software and electronic hardware. Whether these functions are performed by using hardware or software depends on a specific application and design constraints of the technical solution. A person skilled in the art may use different methods to achieve the described functions for each particular application, but such implementation should not be considered as exceeding the scope of the present disclosure.

A person skilled in the art may clearly understand that, for convenient and simple description, for specific working processes of the system, apparatus and unit described above, reference may be made to a corresponding process in the foregoing method embodiments, and details are not described herein again.

In the embodiments provided in this application, it should be understood that the disclosed apparatus and method may be implemented in other manners. For example, the apparatus embodiment described above is only an example. For example, division into the units is only logical function division. There may be other division manners in actual implementation, for example, a plurality of units or components may be combined or integrated into another system, or some features may be ignored or not implemented. In addition, the displayed or discussed mutual couplings or direct couplings or communication connections may be implemented by using some interfaces. The indirect couplings or communication connections between the devices or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, functional units in each embodiment of the present disclosure may be integrated into one processing unit, or each of the units may exist alone physically, or two or more units may be integrated in one unit.

A person of ordinary skill in the art can understand that all or some of the procedures in the methods of the foregoing embodiments may be implemented by a computer program controlling related hardware. The program may be stored in a computer readable storage medium. When the program is executed, the procedures of the embodiments of the foregoing methods may be performed. The foregoing storage medium may be a magnetic disk, an optical disc, a read-only memory (ROM), a random access memory (RAM), or the like.

It may be understood that the embodiments described in the present disclosure may be implemented by hardware, software, firmware, middleware, microcode, or a combination thereof. For hardware implementation, a module, a unit, or a subunit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology described in the embodiments of the present disclosure may be implemented by using a module (for example, a process or a function) that performs the function in the embodiments of the present disclosure. Software codes may be stored in the memory and executed by the processor. The memory may be implemented in the processor or outside the processor.

Although the present disclosure has been described with reference to the preferred embodiments, various improvements may be made to the present disclosure without departing from the scope of the present disclosure and parts thereof may be replaced with equivalents. In particular, as long as there is no structural conflict, the various technical features mentioned in the embodiments can be combined in any manner. The present disclosure is not limited to the specific embodiments disclosed herein, but includes all technical solutions falling within the scope of the claims.

What is claimed is:

1. A wearable device comprising:
   a dial plate, wherein the dial plate is provided with an accommodating groove;
   a watch body, wherein the watch body is at least partially disposed in the accommodating groove and is rotatably connected to the dial plate, and the watch body is provided with a functional component, wherein the functional component comprises a camera component, and the camera component is adjusted to different positions when the watch body rotates relative to the dial plate; and
   an angle detection member, comprising an annular resistor and a conductive connector electrically connected to the annular resistor, wherein one of the annular resistor and the conductive connector is disposed at the dial plate, and the other is disposed at the watch body, and the annular resistor is in sliding connection with the conductive connector; wherein
   the angle detection member is configured to determine a position of the watch body relative to the dial plate by measuring electrical parameters; wherein
   the annular resistor comprises a first annular part and a second annular part which are spaced apart and electrically connected to the conductive connector, the first annular part and the second annular part are coaxially disposed, and the first annular part is electrically connected to the second annular part through a connecting part; wherein
   the first annular part has two opposite first free ends in a rotation direction of the watch body, and the second annular part has two opposite second free ends in the rotation direction, wherein the connecting part connects one of the first free ends and one of the second free ends, and the other of the first free ends is disconnected from the other of the second free ends.

2. The wearable device according to claim 1, wherein the conductive connector comprises a first connector and a second connector, the first connector is electrically connected to the first annular part, and the second connector is electrically connected to the second annular part, wherein a radius of the first annular part is greater than or equal to that of the second annular part.

3. The wearable device according to claim 1, wherein one of the dial plate and the watch body further comprises a limiting ball and an elastic member which abut against each other, and the other of the dial plate and the watch body is provided with a limiting groove, and when the limiting ball is at least partially located in the limiting groove, the dial plate and the watch body are clamped and fixed through the limiting ball and the limiting groove.

4. The wearable device according to claim 3, wherein there are more than two limiting grooves that are spaced apart along a rotation direction of the watch body.

5. The wearable device according to claim 3, wherein the dial plate comprises the limiting ball and the elastic member, a side of the watch body facing the dial plate is provided with the limiting groove, the dial plate is further provided with an installation groove, the elastic member is in sliding connection with the installation groove and is at least partially located in the installation groove; wherein
   when the installation groove and the limiting groove are staggered, the elastic member elastically deforms; or
   when the installation groove is opposite to the limiting groove, the elastic member elastically recovers, and the limiting ball is at least partially located in the limiting groove.

6. The wearable device according to claim 5, wherein a size of an opening of the installation groove is smaller than a diameter of the limiting ball, and the limiting ball is located between the watch body and the elastic member.

7. The wearable device according to claim 1, further comprising a rotary connector, wherein the dial plate is rotatably connected to the watch body through the rotary connector; and
   the rotary connector comprises a rotary guide rail and a guide member which cooperate with each other, wherein one of the rotary guide rail and the guide member is disposed at the dial plate, and the other is disposed at the watch body.

8. The wearable device according to claim 7, wherein a wall surface surrounding the accommodating groove comprises a first side surface and a first bottom surface, and the watch body comprises a second side surface facing the first side surface and a second bottom surface facing the first bottom surface; and
   the second side surface is provided with the guide member, and the first side surface is provided with the rotary guide rail which is in sliding connection with the guide member; and/or, the second bottom surface is provided with the guide member, and the first bottom surface is provided with the rotary guide rail which is located on the second bottom surface and in sliding connection with the guide member.

9. The wearable device according to claim 1, wherein the watch body comprises a display screen and a first housing, wherein the display screen is disposed on a side of the first housing away from the dial plate, the display screen and the first housing form a first accommodating cavity, the conductive connector is disposed at the first housing, the annular resistor is disposed at the dial plate, and the functional component is disposed on a side of the watch body away from the dial plate.

10. A display method performed by a wearable device, wherein the wearable device comprises a dial plate, a watch body, and an angle detection member, wherein the dial plate is provided with an accommodating groove, the watch body is at least partially disposed in the accommodating groove and is rotatably connected to the dial plate, and the watch body is provided with a display screen and a functional component, wherein the functional component comprises a camera component, and the camera component is adjusted to different positions when the watch body rotates relative to the dial plate, the angle detection member comprises an annular resistor and a conductive connector electrically connected to the annular resistor, one of the annular resistor and the conductive connector is disposed at the dial plate, and the other is disposed at the watch body, and the annular resistor is in sliding connection with the conductive connector, wherein the angle detection member is configured to determine a position of the watch body relative to the dial plate by measuring electrical parameters; wherein the annular resistor comprises a first annular part and a second annular part which are spaced apart and electrically connected to the conductive connector, the first annular part and the second annular part are coaxially disposed, and the first annular part is electrically connected to the second annular part through a connecting part; wherein the first annular part has two opposite first free ends in a rotation direction of the watch body, and the second annular part has two opposite second free ends in the rotation direction, wherein the connecting part connects one of the first free ends and one of the second free ends, and the other of the first free ends is disconnected from the other of the second free ends; wherein the method comprises:
receiving first angle information from the angle detection member; and
controlling a display direction of a display interface of the display screen according to the first angle information.

11. The method according to claim 10, wherein the first angle information comprises at least one of first current information, first voltage information, or first resistance information when the annular resistor is in sliding connection with the conductive connector, wherein the first current information, the first voltage information, and the first resistance information correspond to an angle between the dial plate and the watch body.

12. The method according to claim 10, wherein the controlling the display direction of the display interface of the display screen according to the first angle information comprises:
determining a rotation angle and a rotation direction between the watch body and the dial plate according to the first angle information; and
adjusting the display direction of the display interface to an initial display direction according to the rotation angle and the rotation direction, wherein
the initial display direction is a display direction of the display interface of the display screen when the rotation angle between the watch body and the dial plate is 0°.

13. The method according to claim 12, further comprising:
adjusting a performance parameter of the camera component according to the rotation angle and/or the rotation direction, wherein the performance parameter comprises at least one of resolution, focal length, clarity, or contrast.

14. The method according to claim 13, wherein the adjusting the performance parameter of the camera component according to the rotation angle and/or the rotation direction comprises:
determining a shooting mode of the camera component according to the rotation angle and/or the rotation direction;
acquiring a parameter value of the performance parameter in the shooting mode; and
adjusting the camera component according to the parameter value.

15. A wearable device comprising a dial plate, a watch body, and an angle detection member, wherein the dial plate is provided with an accommodating groove, the watch body is at least partially disposed in the accommodating groove and is rotatably connected to the dial plate, and the watch body is provided with a display screen and a functional component, wherein the functional component comprises a camera component, and the camera component is adjusted to different positions when the watch body rotates relative to the dial plate, the angle detection member comprises an annular resistor and a conductive connector electrically connected to the annular resistor, one of the annular resistor and the conductive connector is disposed at the dial plate, and the other is disposed at the watch body, and the annular resistor is in sliding connection with the conductive connector, wherein the angle detection member is configured to determine a position of the watch body relative to the dial plate by measuring electrical parameters; wherein the annular resistor comprises a first annular part and a second annular part which are spaced apart and electrically connected to the conductive connector, the first annular part and the second annular part are coaxially disposed, and the first annular part is electrically connected to the second annular part through a connecting part; wherein the first annular part has two opposite first free ends in a rotation direction of the watch body, and the second annular part has two opposite second free ends in the rotation direction, wherein the connecting part connects one of the first free ends and one of the second free ends, and the other of the first free ends is disconnected from the other of the second free ends; wherein the wearable device comprises a processor, a memory, and a computer program stored on the memory and executable on the processor, wherein the computer program, when executed by the processor, causes the wearable device to perform:
receiving first angle information from the angle detection member of the wearable device; and
controlling a display direction of a display interface of the display screen of the wearable device according to the first angle information.

16. The wearable device according to claim 15, wherein the first angle information comprises at least one of first current information, first voltage information, or first resistance information when the annular resistor is in sliding connection with the conductive connector, wherein the first current information, the first voltage information, and the first resistance information correspond to an angle between the dial plate and the watch body of the wearable device.

17. The wearable device according to claim 15, wherein the computer program, when executed by the processor, causes the wearable device to perform:
   determining a rotation angle and a rotation direction between the watch body and the dial plate of the wearable device according to the first angle information; and
   adjusting the display direction of the display interface to an initial display direction according to the rotation angle and the rotation direction, wherein
   the initial display direction is a display direction of the display interface when the rotation angle between the watch body and the dial plate is 0°.

18. The wearable device according to claim 8, wherein the wearable device further comprises a support member, wherein the support member is disposed between the dial plate and the watch body, and a contact area between the support member and the first bottom surface is larger than a contact area between the support member and the second bottom surface.

19. The wearable device according to claim 1, wherein one of the dial plate and the watch body is provided with an annular open groove, and the other of the dial plate and the watch body is provided with a protrusion matching the annular open groove, and the annular resistor matches at least one of the annular open groove or the protrusion.

* * * * *